(12) United States Patent
Alfano et al.

(10) Patent No.: US 12,211,375 B2
(45) Date of Patent: Jan. 28, 2025

(54) METHOD AND APPARATUS FOR PROVIDING ROAD USER ALERTS

(71) Applicant: BlackBerry Limited, Waterloo (CA)

(72) Inventors: Nicholas Patrick Alfano, Vancouver (CA); Michael Peter Montemurro, Toronto (CA); James Randolph Winter Lepp, Ottawa (CA); Leonard Charles Layton, Vancouver (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 289 days.

(21) Appl. No.: 17/004,847

(22) Filed: Aug. 27, 2020

(65) Prior Publication Data

US 2022/0068120 A1 Mar. 3, 2022

(51) Int. Cl.
*G08G 1/00* (2006.01)
*G08G 1/01* (2006.01)
(Continued)

(52) U.S. Cl.
CPC ......... *G08G 1/0116* (2013.01); *G08G 1/0133* (2013.01); *G08G 1/0141* (2013.01);
(Continued)

(58) Field of Classification Search
CPC .. G08G 1/0116; G08G 1/0133; G08G 1/0141; G08G 1/166; G08G 1/0967; G08G 1/143; G08G 1/162; G08G 1/00; G08G 1/16; G08G 1/005; G08G 1/163; H04W 4/44; H04W 4/80; H04W 4/00; H04W 4/30; H04W 4/40; H04W 4/029; H04W 4/06; H04W 4/023; G08B 29/123; G08B 21/22; G01S 1/0423; G01S 1/00; G01S 1/02; G01S 1/04; G01S 1/042; G01S 1/0426; G01S 1/0428; G01S 1/68; G01S 11/06; H04L 67/26; H04L 67/55; G06F 16/29;
(Continued)

(56) References Cited

U.S. PATENT DOCUMENTS 9,460,615 B2 * 10/2016 Basalamah .......... G08G 1/0112
10,068,473 B1    9/2018 Harrison et al.
(Continued)

FOREIGN PATENT DOCUMENTS

CN        1366441 A   *  8/2002
CN      101091400 B   *  4/2011  ............. F01D 9/023
(Continued)

OTHER PUBLICATIONS

Extended European Search Report, European Application No. 21193405. 4, mailed Jan. 26, 2022.
(Continued)

*Primary Examiner* — James J Yang
*Assistant Examiner* — Anthony D Afrifa-Kyei
(74) *Attorney, Agent, or Firm* — Moffat & Co

(57) ABSTRACT

A method at an infrastructure unit of signaling a presence of a vulnerable road user, the method including receiving at least one report from a sensor unit, the at least one report indicating the presence of the vulnerable road user; composing a message indicating the presence of the vulnerable road user; and transmitting the message to road users proximate the infrastructure unit on a channel.

12 Claims, 10 Drawing Sheets

(51) Int. Cl.
*G08G 1/16* (2006.01)
*H04W 4/44* (2018.01)
*H04W 4/80* (2018.01)

(52) U.S. Cl.
CPC .............. *G08G 1/166* (2013.01); *H04W 4/44* (2018.02); *H04W 4/80* (2018.02)

(58) Field of Classification Search
CPC .... G06F 16/00; G06F 16/20; G06F 16/24578; G06K 9/00476; G06K 9/00791; G06T 7/70; G06T 2207/20076; G06T 2207/30242; G06V 20/56; G06V 30/422
See application file for complete search history.

(56) References Cited

U.S. PATENT DOCUMENTS

| | | | |
|---|---|---|---|
| 10,375,524 B2 | 8/2019 | Liao et al. | |
| 2006/0089154 A1 | 4/2006 | Laroia et al. | |
| 2010/0100324 A1* | 4/2010 | Caminiti | G01S 19/00 701/301 |
| 2013/0127638 A1 | 5/2013 | Harrison | |
| 2013/0314253 A1* | 11/2013 | Mizuguchi | G08G 1/096791 340/901 |
| 2017/0243485 A1* | 8/2017 | Rubin | H04W 4/46 |
| 2017/0309174 A1 | 10/2017 | Gonzales et al. | |
| 2018/0151075 A1 | 5/2018 | Claesson | |
| 2018/0262865 A1 | 9/2018 | Lepp et al. | |
| 2018/0339656 A1 | 11/2018 | Alarcon | |
| 2019/0132709 A1 | 5/2019 | Graefe et al. | |
| 2019/0351896 A1 | 11/2019 | Solmaz et al. | |
| 2020/0229106 A1 | 7/2020 | Nguyen et al. | |
| 2020/0265719 A1 | 8/2020 | Swan | |
| 2021/0065551 A1* | 3/2021 | Manohar | G01S 19/14 |

FOREIGN PATENT DOCUMENTS

| | | | | |
|---|---|---|---|---|
| CN | 106981208 | | 7/2017 | |
| CN | 110418399 A | * | 11/2019 | ............ H04W 4/023 |
| CN | 112086745 A | * | 12/2020 | |
| KR | 10170812 B1 | | 2/2017 | |
| WO | WO-2022081425 A1 | * | 4/2022 | ......... G01C 21/3423 |

OTHER PUBLICATIONS

Hart-Bishop, Jordon, "Advanced Traffic Signal Control using Bluetooth Detectors", University of Waterloo Thesis, 2018.
Zabolotnyy, "BikeApp—Detecting Cyclists Activity and Location Using Bluetooth Low Energy", Tecnico Lisboa Thesis, Nov. 2017.
ATS Traffic, "Traffic Management Solutions", May 2018, downloaded from https://www.atstraffic.ca/wp-content/uploads/2018/05/Traffic-Management-Solutions-v2.pdf.
"Give Me Green", Sensys Networks, https://www.sensysnetworks.com/givemegreen, as archived by Archive.org on Dec. 25, 2019.
"Sens Traffic Data Services", Sensys Networks, https://www.sensysnetworks.com/products/senstraffic, as archived by Archive.org on Sep. 30, 2019.
European Patent Office (EPO): Summons to Attend Oral Proceedings Pursuant to Rule 115(1) EPC for Application No. 21193405.4, dated: Nov. 6, 2024, 13 pages.

* cited by examiner

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | AD LENGTH | | | | | | | | AD TYPE | | | | | | | | MFG ID | | | | | | | | | | | | | | | |
| 4 | 32 | BEACON CODE | | | | | | | | | | | | | | | | BEACON ID | | | | | | | | | | | | | | | |
| 8 | 64 | BEACON ID (CONTINUED) | | | | | | | | | | | | | | | | | | | | | | | | | | | | | | | |
| 12 | 96 | BEACON ID (CONTINUED) | | | | | | | | | | | | | | | | | | | | | | | | | | | | | | | |
| 16 | 128 | BEACON ID (CONTINUED) | | | | | | | | | | | | | | | | | | | | | | | | | | | | | | | |
| 20 | 160 | BEACON ID (CONTINUED) | | | | | | | | | | | | | | | | REFERENCE RSSI | | | | | | | | MFG RESERVED | | | | | | | |

FIG. 7

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| 0 | 0 | AD LENGTH | | | | | | | | AD TYPE | | | | | | | | MFG ID | | | | | | | | OP CODE | | | | | | | |
| 4 | 32 | ALERT BEACON TLVs | | | | | | | | | | | | | | | | | | | | | | | | | | | | | | | |
| 8 | 64 | ALERT BEACON TLVs (CONTINUED) | | | | | | | | | | | | | | | | | | | | | | | | | | | | | | | |
| 12 | 96 | ALERT BEACON TLVs (CONTINUED) | | | | | | | | | | | | | | | | | | | | | | | | | | | | | | | |
| 16 | 128 | ALERT BEACON TLVs (CONTINUED) | | | | | | | | | | | | | | | | | | | | | | | | | | | | | | | |
| 20 | 160 | ALERT BEACON TLVs (CONTINUED) | | | | | | | | | | | | | | | | | | | | | | | | | | | | | | | |
| 24 | 192 | ALERT BEACON MIC | | | | | | | | | | | | | | | | | | | | | | | | | | | | | | | |

FIG. 8

METHOD AND APPARATUS FOR PROVIDING ROAD USER ALERTS

FIELD OF THE DISCLOSURE

The present disclosure relates to safety systems and in particular relates to safety systems for vulnerable road users.

BACKGROUND

Intelligent transport systems (ITS) generally refer to systems in which a plurality of devices communicate to allow for a transportation system to make better informed decisions with regard to transportation and traffic management, as well as allowing for safer and more coordinated decision-making within a transportation network. ITS system components may be provided within vehicles, as part of fixed infrastructure, such as on bridges or at intersections, and for other users of the transportation system including pedestrians or bicyclists. ITS system deployment is receiving significant focus in many markets around the world, with frequency bands being allocated for the communications. In addition to vehicle to vehicle (V2V) communications for safety critical and non-safety critical applications, further enhancements are being developed for vehicle to infrastructure (V2I), vehicle to portable personal scenarios (V2P), which collectively may be called referred to as vehicle to everything (V2X).

A device generally operating in an ITS system is a specialized communication device having a chipset enabled to communicate with other V2X infrastructure. Vulnerable road user ITS-stations generally have ITS functions including receipt of basic safety messages sent from nearby ITS station vehicles. These ITS stations incorporate both 5.9 GHZ (Dedicated Short Range Communications (DSRC), ITS-G5, Long Term Evolution (LTE) PC5 sidelink, LTE network connectivity, and/or 5G (Fifth Generation, also known as NR (New Radio)) cellular transmitters and receivers with associated computational processors, displays, among other form factors.

Conversely, other communications technologies for transmitters and receivers, such as Bluetooth™ are widely deployed. However, such technologies are not generally used for the safety of a vulnerable road user.

BRIEF DESCRIPTION OF THE DRAWINGS

The present disclosure will be better understood with reference to the drawings, in which:

FIG. 7 is a table showing a format for an AltBeacon payload;

FIG. 8 is a table showing a format for a proximity advertisement message payload;

DETAILED DESCRIPTION OF THE DRAWINGS

Figure 1:
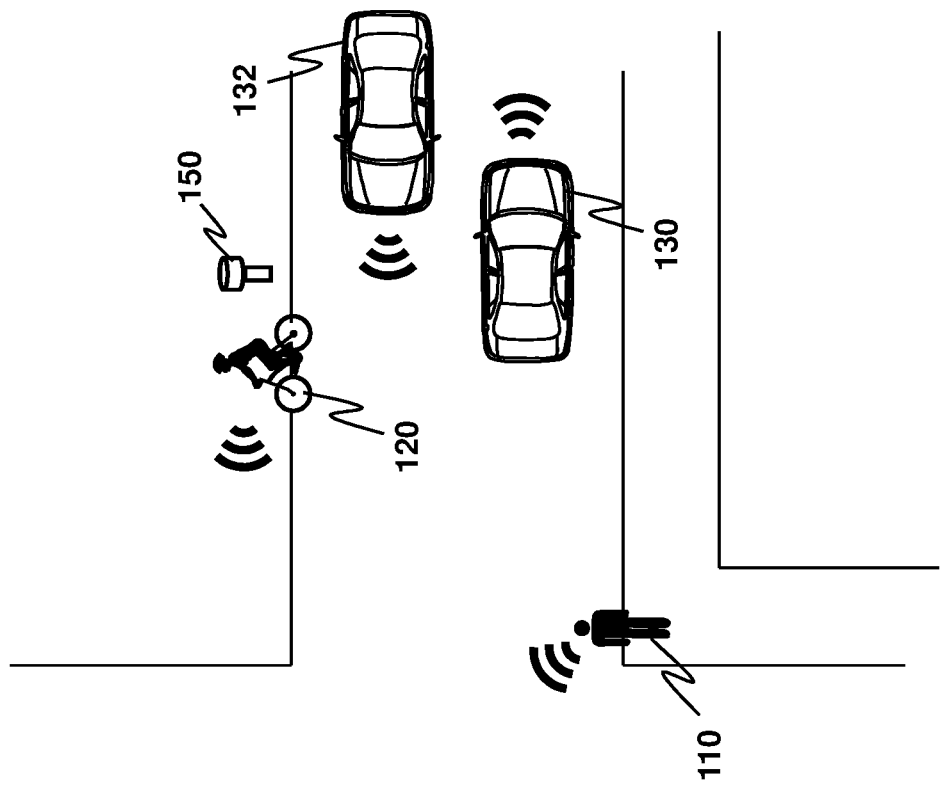
FIG. 1 is a block diagram showing an intersection with a plurality of road users.
Figure 1:
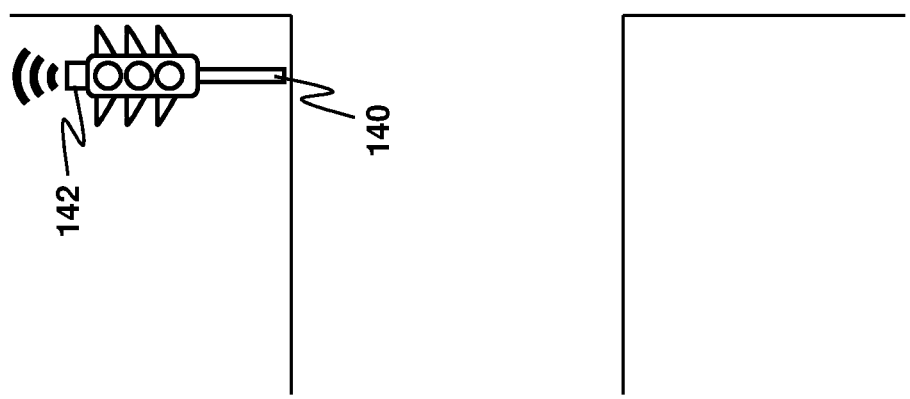

The present disclosure provides a method at an infrastructure unit of signaling a presence of a vulnerable road user, the method comprising: receiving at least one report from a sensor unit, the at least one report indicating the presence of the vulnerable road user; composing a message indicating of the presence of the vulnerable road user; and transmitting the message to one or more road users proximate the infrastructure unit on a channel.

The present disclosure further provides an infrastructure unit for signaling a presence of a vulnerable road user, the infrastructure unit comprising: a processor; and a communications subsystem, wherein the infrastructure unit is configured to: receive at least one report from a sensor unit, the at least one report indicating the presence of the vulnerable road user; compose a message, the message indicating the presence of the vulnerable road user; and transmit the message to road users proximate the infrastructure unit on a channel.

The present disclosure further provides a computer readable medium for storing instruction code, which, when executed by a processor of an infrastructure unit for signaling a presence of a vulnerable road user cause the infrastructure unit to: receive at least one report from a sensor unit, the at least one report indicating the presence of the vulnerable road user; compose a message indicating the presence of the vulnerable road user; and transmit the message to road users proximate the infrastructure unit on a channel.

In accordance with the embodiments of the present disclosure, an improvement to road user safety in urban intersections is provided. For example, in one embodiment, cyclist safety at urban intersections may be improved. In other cases, pedestrian safety may also be improved. In other cases, other vulnerable road users may also have their safety improved based on the embodiments of the present disclosure. In one embodiment of the present disclosure, radio technology may be used to improve safety for cyclists.

In particular, pedestrian, cyclist or other road user injuries, including when pedestrians are hit while on sidewalks, represent a need for improvement of the traffic infrastructure to keep them safe.

The present disclosure may be used with various radio technologies. For ease of illustration, Bluetooth and Bluetooth Low Energy (BLE) are described. This is not, however, meant to be limiting, and other radio technologies can equally be used in accordance with the embodiments described herein.

Bluetooth technology generally refers to a short-range wireless communication technology used for exchanging data between devices over short distances. Bluetooth technology is integrated into many devices, including fixed or mobile devices such as smart phones, user equipment, mobile stations, laptop computers, desktop computers, smart watches or jewelry, endpoints, Internet of Things (IoT) devices including home automation devices, medical equipment in hospital or home environments, inventory tracking devices, environmental monitoring devices, energy management devices, infrastructure management devices, vehicles or devices for vehicles, fixed electronic devices, vehicles, among others. Vehicles may include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and bicycles and other types of vehicles including any combinations of any of the foregoing, whether currently existing or after arising.

For example, Bluetooth is used in many vehicles to allow for communication between mobile devices and an infotainment system.

Further, Bluetooth receivers are being placed in cities at traffic intersections to collect traffic statistics. In particular, these Bluetooth receivers can be used to detect and count traffic passing by an intersection, follow vehicles as they progressively move through the city to measure traffic flow and estimate travel times, among other options.

Such Bluetooth receivers can, in accordance with the embodiments of the present disclosure, be part of the solution to warn drivers of the presence of vulnerable road users approaching an intersection.

In particular, in accordance with the embodiments of the present disclosure, the Bluetooth receivers at intersections may be configured to be able to transmit, thus becoming Bluetooth receivers and transmitter devices. Once a vulnerable road user is identified at or approaching an intersection, the Bluetooth receiver and transmitter at the intersection may transmit a message to Bluetooth devices in the vicinity to warn the device owner of the vulnerable road user at the intersection. As most modern vehicles are Bluetooth enabled, such vehicles can receive these messages.

The Bluetooth receiver and transmitter, referred to herein as an Infrastructure unit, may learn of the presence of the vulnerable road user by receiving a message from a sensor co-located in the vicinity of the Infrastructure unit. Such message would be from a device within the receiving distance for the Infrastructure unit.

The sensor would have the capability to detect the presence of the vulnerable road user. Various sensors, as described below, may be utilized for such detection.

The sensor then may signal the Infrastructure unit that a vulnerable road user is present, and the Infrastructure unit may begin transmitting to selected vehicles that may cross the path of the vulnerable road user in some cases. In other cases, the transmission may be to all vehicles in the vicinity of the Infrastructure unit.

A receiver, such as a Bluetooth device on a vehicle, may receive a message and may then alert the driver through various means, including but not limited to an audible, haptic, or visual alert, and/or some combination of the above.

Topology

Reference is now made to FIG. 1, which shows one example of a topology for a system in accordance with the present disclosure. In particular, a pedestrian 110 is approaching an intersection from a first direction. Similarly, a cyclist 120 is approaching the intersection from a different direction.

Vehicle 130 is moving away from the intersection, and vehicle 132 is moving towards intersection.

A traffic signal 140 may exist, for example on each corner or across the roadway. For simplicity, only one traffic signal 140 is shown in the example of FIG. 1. However, a plurality of such traffic signals can exist within an intersection.

Each such traffic signal may have an Infrastructure unit 142 which may be configured to receive and/or transmit signals. In some cases, Infrastructure unit 142 can be split into a receiver and a transmitter. Further, a plurality of Infrastructure units 142 may exist in an intersection in some embodiments. In other embodiments, a single Infrastructure unit 142 may cover the entire intersection.

One or more sensor units 150 may be used to detect vulnerable road users, including pedestrians and cyclists. For example, sensor unit 150 may be a LIDAR detector, a directional LIDAR detector, a directional location beam radio transmitter, an ultrasound detector, including ultrasonic, magnetic or beam sensor embedded in the road or roadside, a camera, a laser, a pressure sensor, among other options. Depending on the sensors used, sensor unit 150 may be able to determine the speed, location and trajectory of the vulnerable road users in some cases.

A plurality of sensor units 150 may exist around an intersection. For example, multiple sensors may be located on a particular path, such as for monitoring a cycling lane in order to detect the direction and speed of cyclists. In other cases, sensor 150 may communicate with one or more computing devices in order to derive information about the vulnerable road user. For example, the sensor may comprise a camera and the computing device may comprise a visual processor unit used to process an image to determine information such as the presence of the vulnerable road user, the direction of movement of such vulnerable road user, the speed of such vulnerable road user, among other factors.

Other options for data derivation are possible.

Therefore, as cyclist 120 enters a coverage area for sensor 150, the sensor may detect the cyclist.

The sensor unit 150 may signal the Infrastructure unit 142 that cyclist 120 is present. Other data may also be signaled in some cases, such as a direction of travel, a speed of the cyclist, a number of cyclists detected, among other data.

Infrastructure unit 142 may then communicate with various vehicles approaching the intersection.

Infrastructure unit 142 is therefore configured to transmit information to the vehicles in the roadway. The radios within Infrastructure unit 142 can be sectorized, so that the communicated information can be sent in the direction of traffic. For example, dual antennas can be used, one for a narrow beam transmitting in a particular direction, and a second one may be used for a wide beam to provide for a general transmission to all traffic.

The signals transmitted from Infrastructure unit 142 may be powered to optimize for the conditions at the intersection. Therefore, if the intersection is close to other intersections, the power of the signal may be turned down in order to avoid interfering with signals at other intersections. Conversely, if the intersection is spaced apart from other intersections, the power may be turned up in order to reach the vehicles further away and therefore give such vehicles more time to react to such signals.

Vehicles 130 or 132 may be configured with a receiver to receive signals sent by Infrastructure unit 142. Vehicles 130 and 132 may further include a software module capable of processing a signal received from Infrastructure unit 142 and further capable of signaling an alert or warning to the driver of the vehicle. In other cases, the software module may be configured to perform any one or more autonomous actions within the vehicle, such as braking, accelerating, steering, honking the horn or emitting another audible sound, among other options.

The software module may process the vulnerable road user alert message received over the Bluetooth receiver and determine whether to generate a warning or to take other action. For example, a sensor with knowledge of the vehicle trajectory and knowledge of the approaching vulnerable road user can calculate a trajectory of the vulnerable road user compared to the vehicle and generate an alert when a collision course is detected. Such alert may be to the driver of the vehicle, to the vulnerable road user, or both.

The message regarding the vulnerable road user can include speed and trajectory data of such vulnerable road user in some cases. In other cases, the sensor data related to the vulnerable road user's speed and distance can be transmitted to the vehicle in a raw form and the vehicle can use such raw data to find a speed and trajectory, and compare this derived information to its own speed and trajectory to calculate if a collision with the cyclist or other vulnerable road user is imminent.

Detecting a Vulnerable Road User

Figure 2:
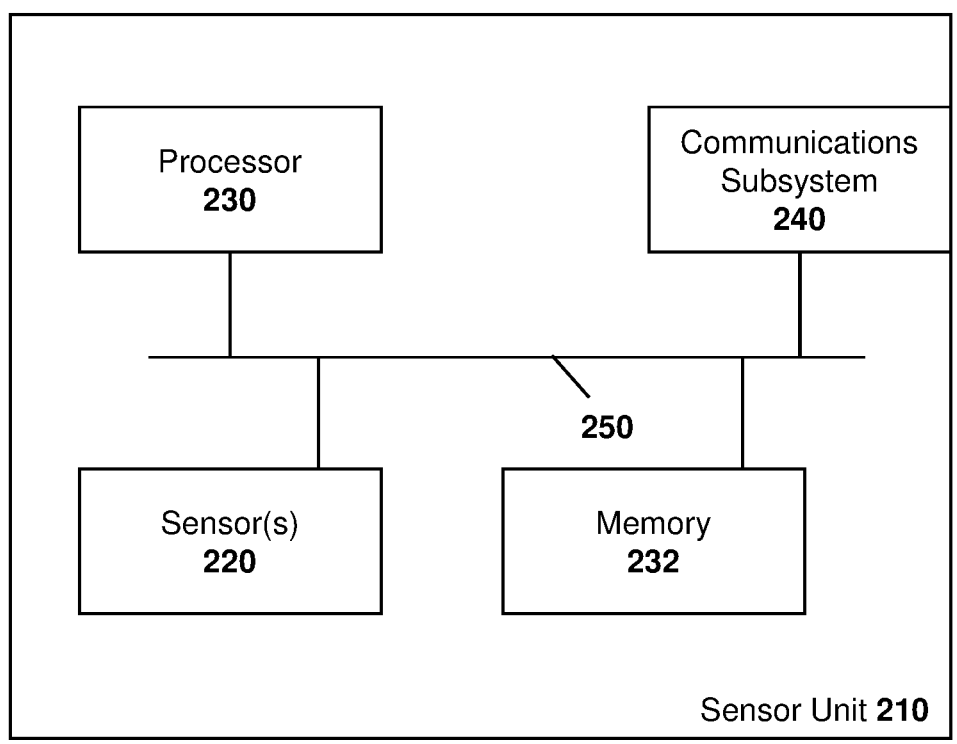
FIG. 2 is a block diagram showing a simplified example sensor unit.

Reference is now made to FIG. 2, which shows a simplified sensor unit 210, such as the sensor unit 150 from FIG. 1.

Sensor unit 210 includes one or more sensors 220 which may be used to detect vulnerable road users. As described above, such sensor 220 may be any sensor capable of detecting a vulnerable road user, including but not limited to a LIDAR, RADAR, beam sensor, pressure sensor, camera, among other options.

In some cases, sensor unit 210 will include a processor 230 in order to process raw sensor data from sensors 220 into processed data. However, processor 230 is optional and in some cases, raw data may be sent directly to a receiver such as Infrastructure unit 142 from FIG. 1.

If sensor unit 210 includes a processor 230, the processor may take the raw sensor data from sensors 220 and determine characteristics of the vulnerable road users, including, but not limited to, the type of vulnerable road users such as a cyclist or pedestrian, a direction that the vulnerable road user is travelling, a speed that the vulnerable road user is travelling, or the number vulnerable road users detected, and/or latency of transmission, among other information. For example, a plurality of bicyclists may reach an intersection at the same time, such as when the cyclists are riding as a group. For example, this may be done based on instruction code which may, for example, be stored in a non-transitory computer readable medium such as memory 232.

Other information can further be derived from sensors 220.

Further, in some cases, only a subset of such data is derived. For example, in some cases, sensor unit 210 may simply detect the presence of a vulnerable road user and no other data.

Utilizing data from other sensors 220 or from processor 230, the data may be provided from the sensor unit 210 to the infrastructure unit through the use of a communications subsystem 240. Communications subsystem 240 may use any wired or wireless communication technology to communicate with the infrastructure unit. For example, the communications subsystem 240 may be a Bluetooth chipset which may be able to communicate using Bluetooth technology. However, in other cases, communications subsystem 240 may use other wireless technologies such as cellular, Wi-Fi, or other such similar wireless technologies. In other cases, communications subsystem 240 may use wired connections if the sensor unit is wired to the Infrastructure unit, including ethernet, fiber optic, co-axial or other wired connections, among other options.

Communications between sensors 220, processor 230, memory 232, and communications subsystem 240 may be done in some cases utilizing a bus 250. However, in other cases, the units may be connected together directly or communicate using other techniques.

While sensor unit 210 is described as a fixed infrastructure unit such as sensor 150 from FIG. 1, in some cases, sensor unit 210 may alternatively be associated with the vulnerable road user. For example, sensor unit 210 may be a mobile device or other transmitting device associated with the pedestrian or cyclist. In other cases, the sensor unit 210 may comprise a mobile device or other transmitting device associated with other vulnerable road users such as a wheelchair user, a motorcyclist, a person on a scooter, or even an animal with a Bluetooth collar, among other options. Such mobile device may, for example, detect that it is within a range of an intersection and may transmit information to an infrastructure unit 142. For example, the mobile device may have a Global Navigation Satellite System (GNSS) such as a Global Positioning System (GPS) which may detect when the mobile device is within proximity of an intersection. This detection may, for example, use geo-fencing technology to fence the intersections that have infrastructure units 142. Geofencing information may be preloaded onto the device or may be downloaded onto a safety application on such device. In other cases, the mobile device may detect beacon signals from infrastructure unit 142 and enter into a safety mode where it will transmit information about the presence of the vulnerable road user. Other options are possible.

The mobile device may then transmit a signal indicating the presence of the vulnerable road user. Other information that may be obtained from the device, for example through the GPS on the device, including a direction of travel, a speed, or other such information, which may further be transmitted to the infrastructure unit.

The fixed or mobile sensor unit 210 may therefore detect and advertise the presence of a vulnerable road user to the infrastructure unit. In particular, reference is now made to FIG. 3.

Figure 3:
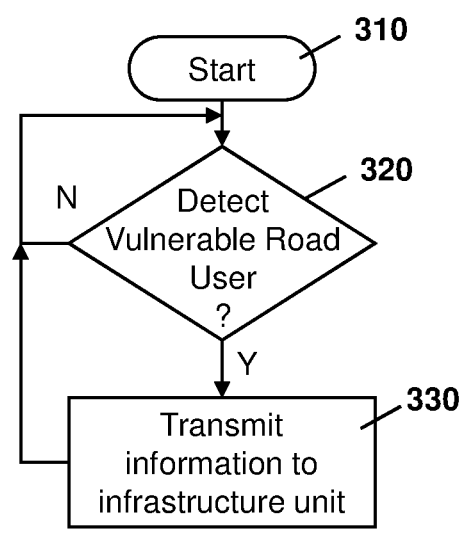
FIG. 3 is a process flow diagram of a process at a sensor unit for reporting sensor information.

The process of FIG. 3 starts at block 310 and proceeds to block 320 in which a sensor unit 210 may determine whether it detects a vulnerable road user. If not, the process may proceed to loop back to block 320. If the sensor unit 210 is associated with the vulnerable road user this step may be skipped.

Once a vulnerable road user is detected, the process proceeds to block 330 in which information about the vulnerable road user may be transmitted to an infrastructure unit such as Infrastructure unit 142 from FIG. 1. The information transmitted at block 330 may include the raw data from sensors 220. In other cases, the information may include data from processor 230, including a type of road user, speed of travel for such vulnerable road user, direction of travel for such road user, number or vulnerable road users detected and/or other data about such vulnerable road user.

Further, in some cases, the information transmitted at block 330 may include identifiers for sensor unit 210 to allow for an infrastructure unit 142 to determine which sensor unit detected the vulnerable road user in order to allow for the infrastructure unit 142 to know which direction the vulnerable road user was detected in.

From block 330, the process proceeds back to block 320 to determine whether additional vulnerable road users are detected.

Infrastructure Unit

The infrastructure unit is capable of receiving communications from one or more sensor units and transmitting information to vehicles and road users on the roadway proximate to the intersection. The infrastructure unit can be mounted, for example, on a traffic light, a lamppost, utility pole, or other infrastructure proximate to the intersection.

For example, the infrastructure unit may comprise a Bluetooth receiver that is configured to estimate traffic conditions. This same Bluetooth receiver can then be repurposed to transmit alerts in accordance with the embodiments of the present disclosure.

Figure 4:
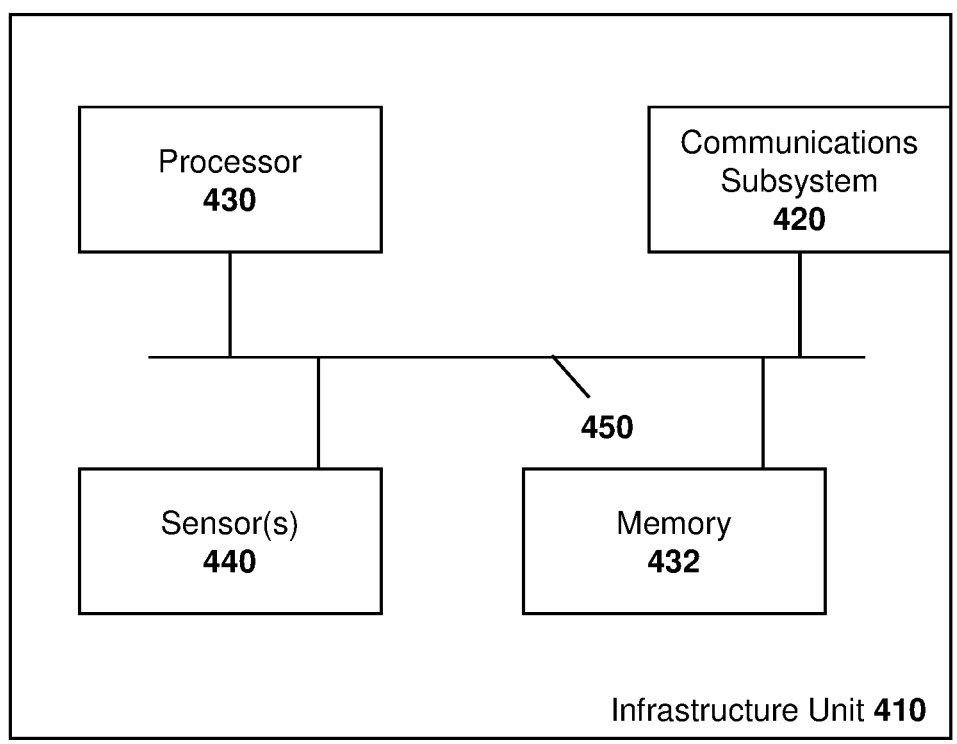
FIG. 4 is a block diagram of a simplified example infrastructure unit in accordance with one embodiment.

Therefore, reference is now made to FIG. 4, which shows a simplified block diagram of an infrastructure unit 410. In the embodiment of FIG. 4, the infrastructure unit 410 includes a communications subsystem 420. Communications subsystem 420 may be used for one or both of the receiving and the transmitting of signals. For example, transmissions may be received from the one or more sensor units communicating with the infrastructure unit 410. Further, communications subsystem 420 may be configured for providing a signal to vehicles or road users in the vicinity of the infrastructure unit 410.

As such, communications subsystem 420 may include one or more wired or wireless communication technologies. For example, communications subsystem 420 may comprise a Bluetooth transmitter and receiver. In other cases, communications subsystem 420 may alternatively or additionally comprise a wired receiver if the sensor units are also wired. Such wired receiver can use various technology including fiber-optic connections, coaxial connections, ethernet connections, among other options. Communications subsystem 420 may further include a receiver and transmitter that is wireless, and the chipset used for such wireless communication may be dependent on the wireless technology used. For example, the wireless technology may include Bluetooth, Wi-Fi, cellular, among other options. In some cases, communications subsystem 410 may support a plurality of communication technologies.

Further, infrastructure unit 410 includes a processor 430. Processor 430 is configured to execute instruction code which may analyze received communications from communications subsystem 420, compile and create signals which may then be sent through communications subsystem 420. Processor 430 may access any non-transitory computer readable medium such as memory 432 for obtaining the instruction code to performance tasks, as well as storing information and data received over communications subsystem 420.

In some embodiments, infrastructure unit 410 may optionally include one or more sensors 440, which may provide data to the processor 430. For example, the infrastructure unit may be mounted on a traffic light and a camera may be used to augment or substitute for information from sensor units.

Communications between communications subsystem 420, processor 430, memory 432, and sensors 440 may be done, for example, over a bus 450. However, in other cases, the communications between the various units may be done through other techniques, including direct connections between such units.

Figure 5:
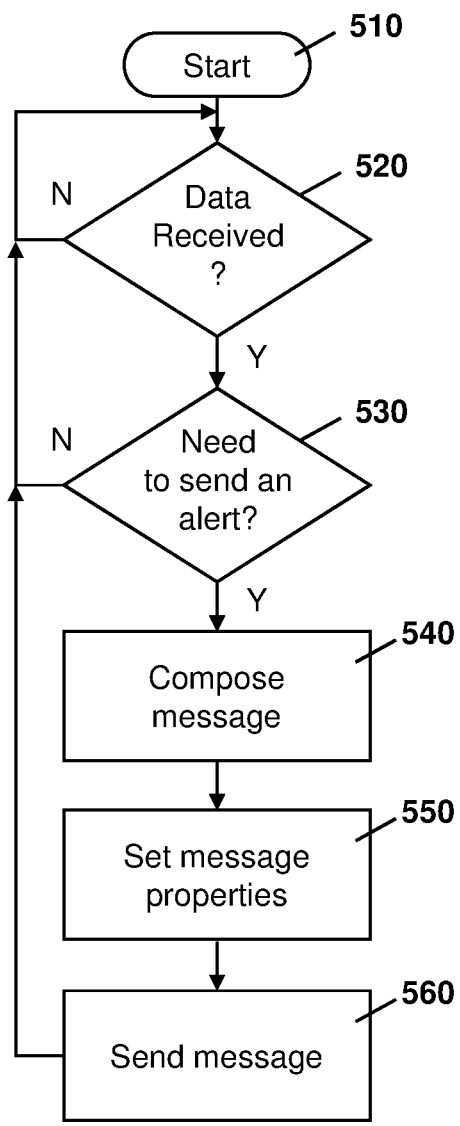
FIG. 5 is a process flow diagram showing a process at an infrastructure unit for sending alert beacons to road users.

The process at the infrastructure unit includes receiving reports from sensor units, compiling the information, creating messages and sending the messages to vehicles or road users in the vicinity of the infrastructure unit. Reference is now made to FIG. 5, which shows a process at an infrastructure unit.

In particular, the process starts at block 510 and proceeds to block 520 in which a check is made to determine whether any data has been received from one or more sensor units. If no, the process continues to loop at block 520 until data is received from one or more sensor units.

Once data is received, the process proceeds from block 520 to block 530 in which a check is made to determine whether an alert needs to be sent. For example, the check at block 530 may determine that the data received from the one or more sensor units does not indicate that the vulnerable road user is close enough to an intersection to provide for a message to be sent. For example, a pedestrian may have stopped on the sidewalk to check a telephone message and therefore may not be moving towards the intersection and therefore the determination at block 530 may be that no alert needs to be sent yet.

In other cases, the check at block 530 may find that no vehicles are approaching the intersection, if sensors are configured to provide such information to infrastructure unit 410, and therefore no alert needs to be sent.

Other options for the determination of whether an alert needs to be sent at block 530 are also possible.

From block 530, if no alert needs to be sent, the process proceeds back to block 520 to continue to check for received data from one or more sensor units.

If an alert is determined to be needed at block 530, the process proceeds to block 540 in which the infrastructure unit 410 may compose the message that needs to be sent.

For example, the message composed at block 540 may comprise a Bluetooth Advertisement packet. In particular, such Bluetooth Advertisement packet may be sent on a Bluetooth Advertising Channel. This mechanism would provide information to vehicles and road users with minimal latency. However, the payload size in this case would be limited based on the maximum length of the Bluetooth Advertisement packet.

In another option, the Bluetooth Advertisement packet on the Bluetooth Advertising Channel can be used to advertise the operating channel for the vulnerable road user presence service. In this case, the infrastructure unit would transmit the presence information on the operating channel. A vehicle receiving the Advertisement packet would then tune to the operating channel to obtain information on presence of vulnerable road users. This mechanism can therefore provide more information but with higher latency due to the radio tuning to the operating channel.

For example, a Bluetooth Low Energy packet is shown with regard to Table 1 below.

TABLE 1

| Bluetooth Low Energy Packet | | | |
|---|---|---|---|
| Preamble | Access Address | Protocol Data Unit (PDU) | CRC |
| 1 byte | 4 bytes | 2-257 bytes | 3 bytes |

Further, the Advertising Channel Protocol Data Unit is shown with regard to Table 2 below.

TABLE 2

| Advertising Channel PDU | |
|---|---|
| Header | Payload |
| 2 bytes | 0-37 bytes |

The Data Channel Protocol Data Unit is shown with regard to Table 3 below.

TABLE 3

| Data Channel PDU | | |
|---|---|---|
| Header | Payload | MIC |
| 2 bytes | Up to 255 bytes (incl. MIC) | 4 bytes |

The Bluetooth Low Energy (BLE) protocol architecture has a Link layer which defines packet formats for the Advertising Channel and Data Channel. Specifically, the BLE packet format shown in Tables 1 to 3 above, is specified in the Bluetooth Low Energy specification document, version 4.2, volume 6, part B, section 2.1.

From Table 1, the preamble is used by a receiver for synchronization of time and frequency and to perform automatic gain control. It is predefined pattern of size 1 byte which is known to the receiver. Advertising packets use "10101010" in binary. The data packets use either "10101010" if the least significant bit of the access address is zero, or "01010101" if the least significant bit of the access address is one, in binary form.

From Table 1 above, the access address for all Advertising packets uses a fixed pattern of "0x8E89BED6" (in hexadecimal form) with the size of four octets, or 32 bits. For data packets, the access address consists of a 32-bit random value generated by a BLE device in the "initiating state". The same value is used as a "connection request (CONNECT_REQ)" message.

Further, from Table 1, the PDU consists of either "Advertising Channel PDU" or "Data Channel PDU", as defined by Tables 2 and 3 above.

The Cyclic Redundancy Check (CRC) is 24 bits in size. It is calculated over the PDU and is used for air detection of the packet. The CRC is calculated using a polynomial of the form $x24+x10+x9+x6+x4+x3+x+1$.

From Table 2, the Advertising Channel PDUs serve various functions. The PDU broadcasts data. Further, it helps the discovery of slaves in order to connect with them. Master and Slave are Bluetooth device roles. It is expected these terms will be updated with more inclusive language in the future.

Further, the Advertising Channel PDUs have different types of Advertising PDUs each with different payload formats and functions. Three different formats and functions include:

a. Advertising PDUs (ADV_IND, ADV_DIRECT_IND, ADV_NONCONN_IND, ADV_SCAN_IND)
  b. Scanning PDUs (SCAN_REQ, SCAN_RSP)
  c. Initiating PDUs (CONNECT_REQ)

A device receives advertisement information transmitted on a Bluetooth Advertising Channel. The payload of such message may be limited e.g. to 37 bytes. If there is additional information that needs to be communicated, the Bluetooth device connects to the advertising device on a secondary channel to receive that information. In this case, the payload of the additional information can be transmitted across multiple frames, each with a payload of 255 bytes.

Therefore, based on the above, one option would be to use a Bluetooth Advertisement packet in order to either signal the presence of a vulnerable road user or to signal to a receiving vehicle to connect to the transmitter to receive additional data over a secondary channel.

In a further case, the use of AltBeacons may be used for advertisement. In Bluetooth AltBeacon terminology, a source of transmission called the "advertiser" and the receiver is called the "scanner".

Since the communication path in this case is unidirectional, Bluetooth beacon technology can be used by the infrastructure to advertise the presence of a vulnerable road user. There are multiple Bluetooth beacon formats, and one possibility would be to use something similar to an AltBeacon. In particular, AltBeacon is a specification which defines the format of an Advertisement message that Bluetooth Low Energy proximity beacons broadcast.

Figure 6:
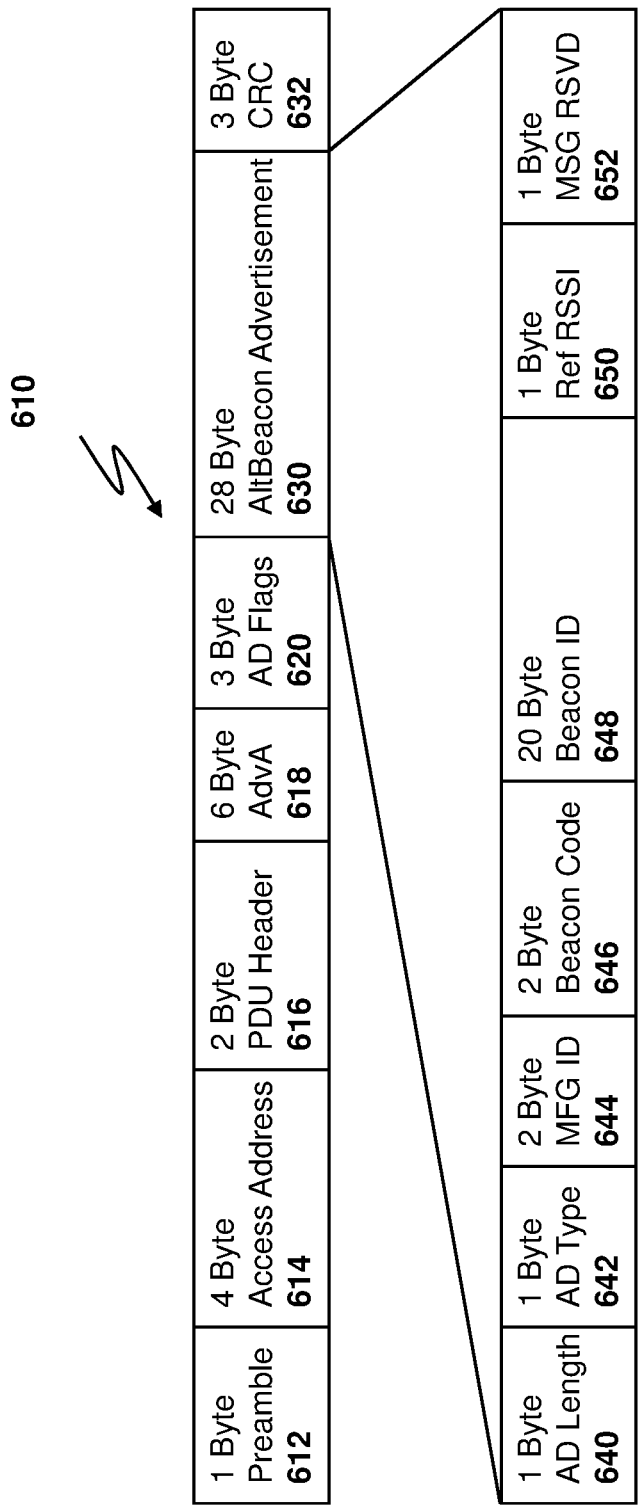
FIG. 6 is a block diagram showing the structure of an AltBeacon Advertisement packet.

Reference is now made to FIG. 6, which shows the format of an AltBeacon packet. In particular, the packet is shown as packet 610. Packet 610 includes a preamble 612, an access address 614, a PDU header 616, an AdvA (Advertiser's Address) field 618, AD (Advertising Data) flags 620, an AltBeacon advertisement field 630, and a CRC field 632.

Further, as seen in FIG. 6, the AltBeacon advertisement field 630 is expanded and includes an AD length field 640, an AD type field 642, a manufacturer (MFG) ID field 644, a beacon code 646, a beacon ID 648, a Reference Received Signal Strength Indicator (RSSI) 650, and an MSG Reserved (RSVD) field 652.

The format of an AltBeacon payload is provided with regard to FIG. 7, which shows the protocol diagram from the AltBeacon specification.

In accordance with the embodiments of the present disclosure, the protocol diagram of FIG. 7 can be adapted to provide for a "proximity advertisement" to signal to vehicles or other road users the presence of a vulnerable road user. One option for a format for a "proximity advertisement" is shown with regard to FIG. 8.

As seen in the example of FIG. 8, one format of a "proximity advertisement" is shown. The example of FIG. 8 is however not limiting, and other formats for such proximity advertisement are possible.

The parameters within the proximity advertisement format of FIG. 8 are, for example, defined in Table 4 below.

TABLE 4

| Protocol Data Structure | |
|---|---|
| Parameter | Value |
| AD LENGTH | <length of advertising payload> |
| AD TYPE | 0xff |
| MFG ID | <mfg id associated with proximity alert applications> |
| OP CODE | 0x00-on channel only; 0x01-off channel available; |
| ALERT BEACON TLVs | TLVs describing the alert condition |
| ALERT BEACON MIC | 32 bit MIC for message |

As seen in Table 4, and OP CODE is available to indicate whether the information about the proximity advertisement is only within the Advertising message or whether it is available through an off channel.

Further, alert beacon Type-Length-Values (TLVs) may be provided to indicate the specific information about the proximity alert for the vulnerable road user.

In some embodiments, if the infrastructure requires a smaller payload for the advertisement, the Advertising beacon on the BLE Advertisement Channel is a non-connectable packet of the type ADV_IND, and the payload is set with an OP code of 0x00. If the alert data requires a larger payload, the OP code is set to 0x01 and the advertisement is extended across multiple advertisement and data packets.

From Table 4, the MIC is calculated based on the contents of the advertisement message.

In this way, the AltBeacon Advertisement message contains information on vulnerable road users detected on the roadway. The Advertisement message may include a number of cyclists or pedestrians, followed by a list of a Mini Safety Message TLV representing each vulnerable road user.

For example, one TLV is described with regard to Table 5 below. However, the TLV as described with regard to Table 5 is merely provided for illustration purposes and in practice the TLVs can be designed for a particular application or can be altered based on particular infrastructure needs.

TABLE 5

AltBeacon Advertisement Information

| Beacon TLV Type | Index | Description |
| --- | --- | --- |
| Number of vulnerable road users | 1 | The number of vulnerable road users detected, followed by personal safety message (PSM) ASN1 entries |
| MiniSafetyMessage | 2 | A PSM message, for example is derived from the J2735 message dictionary or similar |
| Integrity Level | 3 | The level of accuracy and reliability on the data in the message |
| Beacon MIC | 4 | A 32 bit MIC for a message signed by the RSU. An MIC generated by the transmitter over the payload of the message using a key associated with the infrastructure equipment. |

In the embodiment of Table 5 above, a sensor can use part of a Basic Safety Message (BSM) format or encoding, as for example defined in the SAE J2735 "V2X Communications Message Set Dictionary", standards as for example published in November 2019, to send information about a cyclist or vulnerable road user to vehicles inside Bluetooth AltBeacon Advertisement payload. For example, various parts of the Basic Safety Message that may be reused in accordance with the embodiments of present disclosure may include a timestamp; a speed and heading; and/or a position such as a latitude or longitude.

Further, an identifier for the Bluetooth transmitter may be used to uniquely distinguish such transmitter among possible multiple transmitters or advertisers and also to identify it as a transmitter of safety information and not as a transmitter of opportunistic advertising.

BSM messaging and other J2735 messaging are traditionally described in the ASN.1 syntax and encoded using Unaligned Packed Encoding Rules (UPER). However, other encodings are possible.

The J2735 "message set dictionary" allows for extensions, or for specific subsets of data frames and data elements. The J2945/1 BSM can be as large as 367 bytes, although it is typically around 200 bytes. By choosing a specific subset of the message set, for example as defined in Table 6 below, the message can be kept to the 20 byte limit in the AltBeacon frame, or a 238 byte limit of the Bluetooth 5.0 extended Advertising frame.

TABLE 6

AltBeacon Advertisement Information

MiniSafetyMessage ::= SEQUENCE {
  basicType PersonalDeviceUserType,
  secMark DSecond,
  msgCnt MsgCount,
  id TemporaryID,
  position Position3D, -- Lat, Long, Elevation
  accuracy PositionalAccuracy,
  speed Velocity, TABLE 6-continued AltBeacon Advertisement Information heading Heading
}

Therefore, in accordance with the embodiment of Table 6, the Mini Safety Message can contain information about a vulnerable road user including information such as an identifier for such vulnerable road user, a position including latitude, longitude, elevation, and accuracy of the position, a speed and heading, among other information. However, in other cases, various subsets of such information or various additional information may be provided in a Mini Safety Message.

The encoding of the message of Table 6 can be in almost any format, as long as a receiver knows how to decode it. In this case, a type indicator and length indicator followed by the encoded data may allow a receiver to decode the data more easily. This follows the TLV style. The type may be a version number of the standard. The encoded data can be one of many ASN. 1 encodings, such as Unaligned Packed Encoding Rules (UPER) or Distinguished Encoding Rules (DER), among various options.

One optional TLV is the integrity level, which may give a level of accuracy and reliability of the data in a message dependent on the characteristics of the sensor. The levels may be encoded as an integer in the range of, for example, 1 to 5, where "5" means a higher reliability and "1" means a lower reliability. However, other values are possible.

The infrastructure can signal a single cyclist or vulnerable road user, or may signal a group of vulnerable road users if they are together. For example, a group of cyclists riding together may be advertised in a single MiniSafetyMessage and assigned a single Temporary ID. Similarly, a group of pedestrians walking together may also be advertised in a single MiniSafetyMessage and assigned a single Temporary ID.

Therefore, referring again to FIG. 5, the message being composed at block 540 can utilize the techniques described above, for example with reference to FIG. 8 and Tables 5 and 6.

From block 540, the process proceeds to block 550 in which message properties may be optionally set for such message. For example, in one embodiment, the message properties may indicate a direction that the message will be sent in. This may apply if the vulnerable road users are approaching the intersection from a particular area and only those vehicles that are approaching from a specific direction need a warning.

In other cases, the properties may include a power level at which the message is sent out. For example, a message in which an imminent collision is predicted can be sent at a higher power in order to ensure that it is received by the relevant vehicles. This may be done irrespective of whether interference with the adjoining intersections may be experienced.

In other cases, the properties may include a frequency at which the Advertisement message is sent. For example, if an Advertisement message is typically sent every one hundred milliseconds, if a vulnerable road user is approaching from a first direction and a second vulnerable road user is approaching from a second direction, two Advertisement messages may be needed to provide indications to the vehicles that such vulnerable road users exist. In this case, in accordance with one embodiment the present disclosure the frequency at which the Advertisement message is sent may be reduced in order to provide the information for multiple vulnerable road users to a vehicle in the same amount of time. Thus, for example, the period for the sending of the Advertisement messages may be reduced 50 ms to ensure that the vehicle knows about the plurality of vulnerable road users, each with different identifiers.

In other cases, no properties need to be set at block 550 and therefore the process at block 550 is optional.

From block 550, the process proceeds to block 560 in which the message is sent. The message is sent based on the contents of the message as composed at block 540 and the properties of the message that were optionally set at block 550.

From block 560, the process proceeds back to block 520 in which the infrastructure unit 410 continues to monitor whether any data is received from sensors.

While the embodiment of FIG. 5 sends Advertisement messages on an as needed basis, in other embodiments of the present disclosure Advertisement messages may be sent regardless of whether any vulnerable road users exist in the roadway. Thus, in some cases, the message sent at block 550 can indicate that no vulnerable road users exist. In this case, the message may be sent at a specific interval, such as every 100 milliseconds, even if no vulnerable road users exist.

In this embodiment, the checks at block 520 and 530 may be avoided, and instead, the process would start at block 540 in which the message is composed indicating whether any vulnerable road users exist and the properties of such vulnerable road users if they do exist.

At block 550, the properties of the message may still optionally be set. Thus, the frequency can still be increased if multiple vulnerable road users are being reported, each with its own temporary identifier.

Further, as indicated above, more information about a vulnerable road user or less information about a vulnerable user than that described in Table 6 are possible. Therefore, in some cases, the presence of the vulnerable road users may be the only information sent by infrastructure unit 410. In other cases, specific information including position, trajectory, road user type, among other information may be sent.

Vehicle Computing Device

The entity receiving a message from the infrastructure unit can be any road user within the road infrastructure, including, but not limited to, cars, trucks, bicycles, other pedestrians, among others. In the embodiments of the present disclosure, the vehicle computing device may belong to any such road user.

Figure 9:
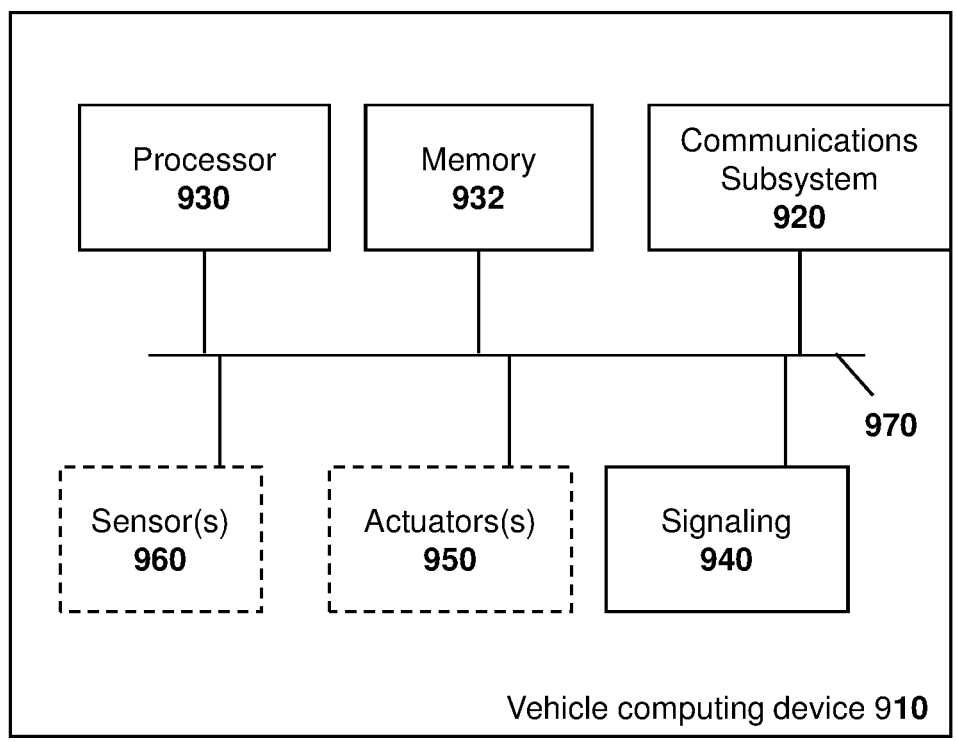
FIG. 9 is a block diagram of a simplified example vehicle computing device in accordance with one embodiment.

Reference is now made to FIG. 9, which shows a simplified block diagram for a vehicle computing device 910. In particular, in the embodiment of FIG. 9, the vehicle computing device 910 includes a communications subsystem 920. Communications subsystem 920 is designed to be able to communicate with an infrastructure unit such as infrastructure unit 410 from FIG. 4. For example, the communications subsystem 920 may include a Bluetooth receiver which may be capable of receiving Advertisement messages from an infrastructure unit 410. The Bluetooth receiver within the communication subsystem 920 may previously exist, for example, in a vehicle for other purposes such as part of an infotainment system, as part of a safety or vehicle tracking system, among other options. In other cases, the Bluetooth receiver or other such receiver within the communications subsystem 920 may be dedicated for traffic safety purposes.

The design of communication subsystem 920 is therefore based on the type of signal that is expected to be received. In the example of a Bluetooth signal, a Bluetooth chipset may be used in which the Bluetooth signal can be received, decoded and provided to a processor 930.

Processor 930, using instruction code with may be stored in a non-transitory computer readable medium, such as memory 932, can analyze signals received over the communications subsystem 920. In the example of FIG. 9, processor 930 can make determinations as to whether or not an action is required at the vehicle. Such actions may include signaling to a driver of the vehicle through a variety of techniques as described below. Other actions may include actuating a mechanism on the vehicle such as engaging the braking system, steering system, accelerator, among other options.

Thus, processor 930 may communicate with various signaling mechanisms 940. Such signaling mechanisms, for example, can include audible signaling mechanisms such as the use of speakers within the vehicle or associated with the computing device 910. In other cases, the signaling mechanism 940 may include a haptic mechanism within the steering wheel or seat of vehicle. Other signaling mechanisms may include a visual signaling mechanism such as a light, a message on a screen within the vehicle, among other similar visual signaling options. In this regard, signaling mechanism 940 may include one or multiple audio, visual, or haptic signaling mechanisms, which may be used alone or together.

In other cases, actuators 950 can be used. For example, the actuators may include braking actuators, acceleration actuators, steering actuators, among other options.

When taking control of the vehicle, the processor 930 may need to be sure that a hazard exists. In some cases, the information provided by the infrastructure unit 410 may be sufficient for this. In other cases, an optional sensor unit 960 may be utilized to provide additional sensor information to the vehicle in order to make decisions on whether to engage the brakes, accelerator, steering, among other such actuators.

In the embodiments of the present disclosure, the various mechanisms for signaling or actuating control of the vehicle are optional. In this regard, the vehicle computing device 910 may have no control of vehicle actuators 950 and, as such, this module is optional. Further, no other sensors may provide information to the processor 930 and therefore sensor unit 960 is also optional.

Based on above, a wireless receiver on the vehicle, such as a Bluetooth receiver, is configured to receive beacons from the infrastructure and issue warnings to the driver or, in some cases, to perform actions at the vehicle.

The wireless receiver in the vehicle can be configured to receive all information from the infrastructure on all vulnerable road users in the coverage area. Alternatively, the wireless receiver may be configured to receive advertisement information and make a binary determination on whether there is at least one vulnerable road user present or not.

Figure 10:
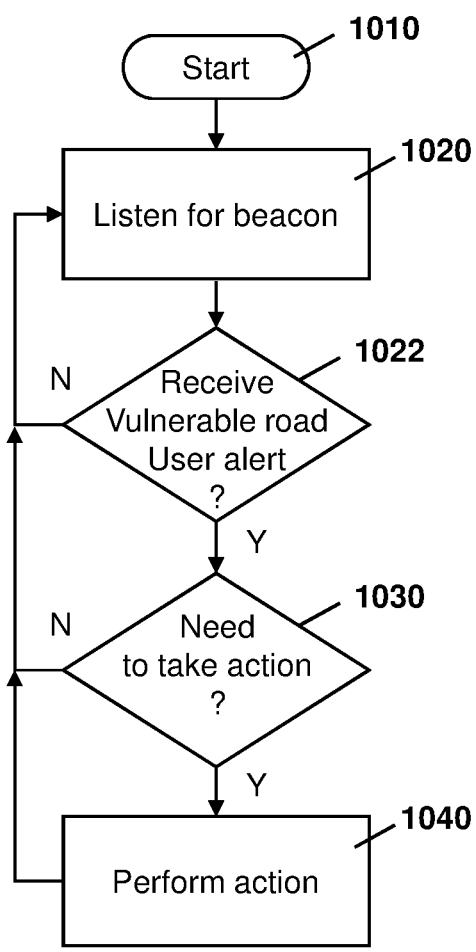
FIG. 10 is a process flow diagram showing a process at a vehicle computing device for performing an action based on a received beacon.

One process at a vehicle is, for example, described with reference to FIG. 10. The process of FIG. 10 starts at block 1010 and proceeds to block 1020. At block 1020, the computing device at the vehicle listens for a beacon. For example, this may be the Bluetooth Advertisement beacon from an infrastructure unit.

The process then proceeds to block 1022 in which a check is made to determine whether a vulnerable road user alert has been received. If not, the process proceeds back to block 1020 at which the vehicle computing device continues to listen for the beacon.

Once a vulnerable road user alert has been received, as determined at block 1022, the process proceeds to block 1030 in which a check is made to determine whether an action needs to be taken. For example, action may need to be taken if the vehicle is moving towards the vulnerable road user. If the vehicle has already passed through the intersection and is moving away from the vulnerable road user, the check at block 1030 may determine that no action needs to be taken.

In other cases, the determination at block 1030 may utilize information about the vehicle and the information within the message to make a determination on whether a collision is possible or probable. In this case, information from the vehicle such as the vehicle speed, trajectory and position may be correlated with information from the message, including the position, speed and trajectory of the vulnerable road user. A check may be made to determine whether the vehicle and the vulnerable road user will pass within a threshold distance of each other, for example, and if yes, then the determination at block 1030 is that an action is needed.

In other cases, the check at block 1030 may use a plurality of consecutive messages to make the determination. Thus, for example, a first Advertisement message about the vulnerable road user may indicate a position for such vulnerable road user. A second message may also provide a position for such vulnerable road user. The processor at the vehicle computing device may therefore use the consecutive position information to determine a trajectory and speed for such vulnerable road user in order to make the calculation to determine whether a collision is possible or probable. Further, as more messages are received, the accuracy for the determination of the position, speed and trajectory of the vulnerable road user may improve.

The check at block 1030 may make the determination for each of the vulnerable road users identified. Thus, if two vulnerable road users are approaching the intersection, as identified using different temporary identifiers in Advertisement messages, then the check at block 1030 may determine that an action is required if a collision is possible or probable with even one of the vulnerable road users.

In other cases, the receipt of the alert at block 1022 may be sufficient to perform an action and therefore, the determination of block 1030 may always be positive.

Once it is determined at block 1030 that an action needs to be performed, the process proceeds to block 1040 in which the action is performed. Such action may include using one or more of the auditory, visual or haptic alert systems within the vehicle.

In other cases, with the action may include using actuators such as braking, steering, or acceleration systems.

In some cases, the action may be based on the type of vulnerable road user. For example, a different audio message may be played if a pedestrian alert is received rather than a bicycle alert. Further, if a group of bicyclists are riding together, this may also produce a different alert.

Further, if more than one vulnerable road user is detected in an intersection, multiple actions can be performed at block 1040, such as multiple audio alerts or multiple visual alerts being displayed. Alternatively, the alert can be different if multiple vulnerable road users are detected compared to one vulnerable road user.

In some cases, the action at block 1040 may depend on the probability of collision or time until a collision is predicated. Thus, for example, a beep can sound to indicate the presence of a vulnerable road user as a driver approaches an intersection. A louder or different audio alert may sound if the vehicle and vulnerable road user get within a threshold distance of each other, or a collision is predicted within a threshold time period.

For example, a bicycle that is traveling in a bicycle lane more than 40 meters from a vehicle may not trigger a warning to a driver. A bicycle that is traveling in a shared lane less than 40 meters from a vehicle may trigger a warning indication such as a warning light. A bicycle that is traveling in a bicycle lane less than 20 meters from the vehicle may trigger a further warning indication such as a warning sound. A bicycle that is within 10 meters of the vehicle at an intersection where the vehicle is turning may trigger both a warning light in an audible alarm. Other examples are possible.

From block 1040 the process proceeds back to block 1020 in which the vehicle computing device continues to listen for beacons.

The above solutions therefore offer a warning to vehicles utilizing Advertisement beacons to indicate the presence of a vulnerable road user and therefore increase the safety of such vulnerable road user.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at an infrastructure unit of signaling a presence of a vulnerable road user, the method comprising:
   receiving at least one report from a sensor unit, the at least one report indicating the presence of the vulnerable road user;
   composing a message indicating the presence of the vulnerable road user;
   and
   transmitting the message to one or more road users proximate the infrastructure unit on a channel from a directional antenna, wherein a direction for the transmitting is selected based on a position of the vulnerable road user, the position comprising at least one of latitude, longitude, accuracy of the position, speed, and heading;
   wherein a power for the transmitting is selected based on interference with other infrastructure units, such that the power varies according to a distance from the infrastructure unit to a nearest intersection with at least one other infrastructure unit;
   wherein the message comprises a Bluetooth Advertisement packet or a Bluetooth Low Energy AltBeacon Advertisement and wherein the message includes information for an operating channel for a vulnerable road user presence service.

2. The method of claim 1, wherein the message includes information comprising at least one of the presence of the vulnerable road user, a type of vulnerable road user, a direction that the vulnerable road user is travelling, a speed that the vulnerable road user is travelling, a number vulnerable road users detected in a group, a latency of transmission, or a temporary identifier for the vulnerable road user.

3. The method of claim 1, wherein the message includes an integrity level.

4. The method of claim 1, wherein a frequency for the transmitting increases when multiple vulnerable road users are detected.

5. An infrastructure unit for signaling a presence of a vulnerable road user, the infrastructure unit comprising:
   a processor; and
   a communications subsystem,
   wherein the infrastructure unit is configured to:
   receive at least one report from a sensor unit, the at least one report indicating the presence of the vulnerable road user;
   compose a message, indicating the presence of the vulnerable road user;
   and
   transmit the message to one or more road users proximate the infrastructure unit on a channel from a directional antenna, wherein a direction for the transmitting is selected based on a position of the vulnerable road user, the position comprising at least one of latitude, longitude, accuracy of the position, speed, and heading;
   wherein a power for the transmitting is selected based on interference with other infrastructure units, such that the power varies according to a distance from the infrastructure unit to a nearest intersection with at least one other infrastructure unit;
   wherein the message comprises a Bluetooth Advertisement packet or a Bluetooth Low Energy AltBeacon Advertisement message and wherein the message includes information for an operating channel for a vulnerable road user presence service.

6. The infrastructure unit of claim 5, wherein the message includes information comprising at least one of the presence of the vulnerable road user, a type of vulnerable road user, a direction that the vulnerable road user is travelling, a speed that the vulnerable road user is travelling, a number vulnerable road users detected in a group, a latency of transmission, or a temporary identifier for the vulnerable road user.

7. The infrastructure unit of claim 5, wherein the message includes an integrity level.

8. The infrastructure unit of claim 5, wherein a frequency for the transmitting increases when multiple vulnerable road users are detected.

9. A non-transitory computer readable medium for storing instruction code, which, when executed by a processer of an infrastructure unit for signaling a presence of a vulnerable road user cause the infrastructure unit to:

receive at least one report from a sensor unit, the at least one report indicating the presence of the vulnerable road user;

compose a message, the message indicating the presence of the vulnerable road user; and transmit the message to one or more road users proximate the infrastructure unit on a channel from a directional antenna, wherein a direction for the transmitting is selected based on a position of the vulnerable road user, the position comprising at least one of latitude, longitude, accuracy of the position, speed, and heading;

wherein a power for the transmitting is selected based on interference with other infrastructure units, such that the power varies according to a distance from the infrastructure unit to a nearest intersection with at least one other infrastructure unit;

wherein the message comprises a Bluetooth Advertisement packet or a Bluetooth Low Energy AltBeacon Advertisement message and wherein the message includes information for an operating channel for a vulnerable road user presence service.

10. The non-transitory computer readable medium of claim 9, wherein the message includes information comprising at least one of the presence of the vulnerable road user, a type of vulnerable road user, a direction that the vulnerable road user is travelling, a speed that the vulnerable road user is travelling, a number vulnerable road users detected in a group, a latency of transmission, or a temporary identifier for the vulnerable road user.

11. The non-transitory computer readable medium of claim 9, wherein the message includes an integrity level.

12. The non-transitory computer readable medium of claim 9, wherein a frequency for the transmitting increases when multiple vulnerable road users are detected.

* * * * *